Dec. 21, 1965   E. L. BALLARD   3,224,145
FLY TRAP
Filed Feb. 13, 1963
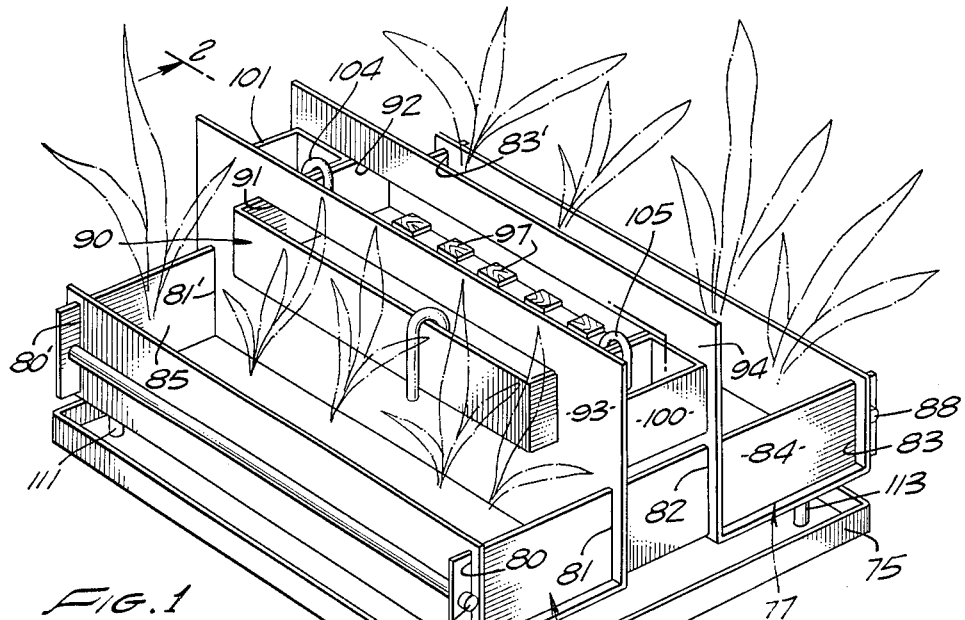
FIG. 1
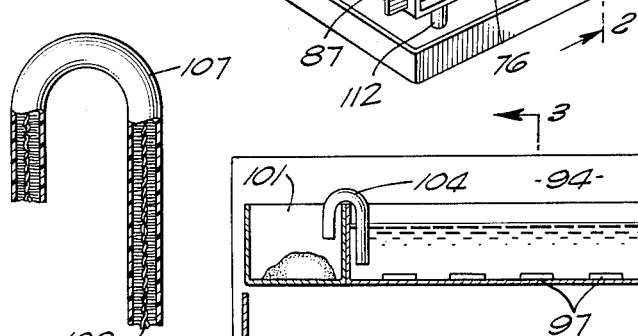
FIG. 4
FIG. 2
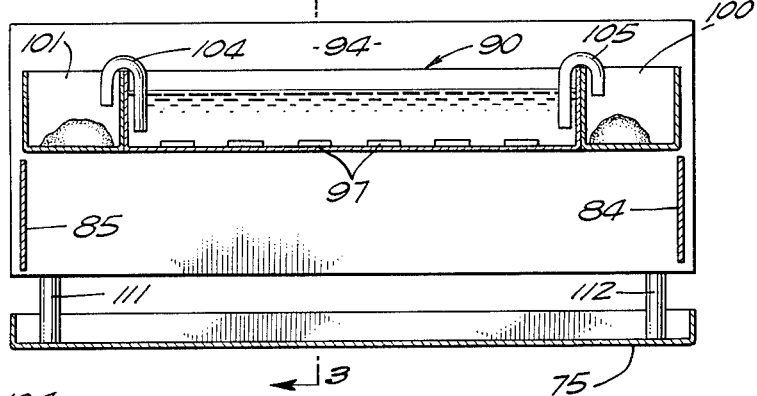
FIG. 3
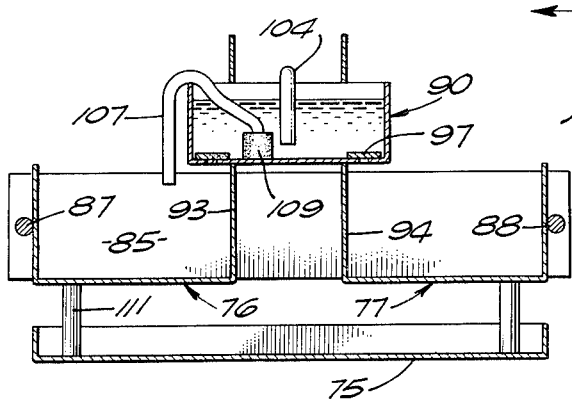
EARCY L. BALLARD
INVENTOR.
BY
Edward C. Walsh
ATTORNEY United States Patent Office 3,224,145
Patented Dec. 21, 1965

3,224,145
FLY TRAP
Earcy L. Ballard, 16640 Randall Ave., Fontana, Calif.
Filed Feb. 13, 1963, Ser. No. 258,263
4 Claims. (Cl. 47—38.1)

This invention relates to novel and improved forms of insect traps for killing numerous types of flies and insects, including mosquitos, moths, June bugs, spiders and other types of insects that inhabit trees, including brown and green hoppers, etc.

The primary object of the invention is to provide an extremely effective, but simple and economic trap of this type, and further to provide such a device which is entirely safe. It is safe in that the poison that is used is not exposed to chlidren or animals such as to endanger them, and it cannot contaminate or pollute ground water. It is known that extensive use of insecticides in the past has had the effect of polluting ground water as well as destroying bird life and otherwise being unsafe.

Various types of lures or poisons may be used in the trap. It has been found that dead flies themselves constitute a powerful lure to attract other flies and to bring about their destruction.

In one form of the invention it is combined with a planter so that the plants serve as an attraction for the insects, and additionally a supply of water is provided to keep the lure or poison moistened and at the same time to water the plants.

In accordance with the foregoing, another object of the invention is to provide a fly trap comprising containers for a lure or poison and for water, and means for causing a regulated transfer of water from the container containing the water to the other container to keep the lure or poison moist, the containers being arranged to allow insects to have access to the lure or poison.

Another object is to provide a unit which is a combined planter and fly trap whereby each contributes to the utility and effectiveness of the other.

Another object is to provide a unit or device as in the foregoing comprising one or more soil containers providing a planter or planters combined with at least one container for lure and a water tank; and means in the combination for transferring water from the water tank to the lure and to the soil containers.

Further objects and numerous additional advantages of the invention will become apparent from the following detailed description and annexed drawings wherein:

FIGURE 1 is a perspective view of one form of the invention.

FIGURE 2 is a sectional view taken along the line 2—2 of FIGURE 1.

FIGURE 3 is a sectional view taken along the line 3—3 of FIGURE 2.

FIGURE 4 is a detail view of a water transfer means.

FIGURES 1, 2, 3, and 4 of the drawings show a combined planter and insect trap. This combination can be used individually in any desired place, or it can be used in multiples in large numbers or arrays, with one suspended over another covering a large area. In this way, the device can be adapted to agriculture and/or the growing of vegetables or other plants so as to greatly augment the amount of food that can be grown and raised on or over a land area of a particular size.

As shown in these figures, the assembly is preferably one that can be readily assembled and disassembled or knocked down. At the bottom is shown a drip pan 75 suspended from the unit. The parts may be made of suitable materials such as plastic or metal or otherwise. Above the drip pan are two soil baskets 76 and 77 mounted back to back. These baskets are made of material provided with slots in their side walls as indicated at 80 and 81; 82 and 83; 80' and 81', etc. Extending through the slots laterally are end pieces 84 and 85 whereby two containers are formed for the soil in which the plants are grown. These end pieces are held in position by rods or battens as shown at 87 and 88, extending through openings in the end pieces.

Numeral 90 designates a water tank of rectangular shape the side parts of which fit into openings 91 and 92 in the upstanding back walls 93 and 94 of the two soil containers or baskets. The unit may be supported from these two upstanding back walls.

In the bottom of the water tank there are provided a plurality of blocks of balsa wood 97 having openings through them, and through the bottom of the water tank so that the water can drip down into the soil baskets for watering the plants.

Adjacent the opposite ends of the water tank 90 are two tanks or containers 100 and 101 for the lure or poison, for killing the insects. Tubes as shown at 104 and 105 are provided, of bent formation and looped over the sides of the lure tanks. These tubes contain wicks to allow water to be drawn from the water tank up and over into the lure tanks for moistening the poison. An additional tube 107 and wick 108 is provided looped over the side of the tank 90 to allow water to flow from the tank and drip into the soil baskets. A weight 109 is provided at the end of this bent tube and it may be positioned to any point in the water tank.

The lure may be of any of various types of lures or poisons commercially available, such as Fly Killer XXX made by Esco Chemical Company.

The pan 75 may be suspended by, or it may support the planter and trap by members as shown at 111, 112 and 113. The planter itself provides a means of growing plants in a way which avoids limitations of land area by allowing vertical arrays of units, a principle which may become critical as populations continue to explode. The planter and fly trap each contribute to the effectiveness and utility of the other in the combination. The plants and foliage assist in attracting the insects and the trap then destroys them preventing them from damaging the plants. The water transfer arrangements provide for keeping the lure or poison moist as well as watering the plants. The weighted water transfer tube being movable makes it possible to easily adjust the point of water transfer for the plants.

From the foregoing it will be apparent to those skilled in the art that the invention described herein achieves and realizes all of the objects stated in the foregoing as well as having all of the advantages enumerated.

The foregoing disclosure is representative of a preferred form of the invention and is to be interpreted in an illustrative rather than a limiting sense, the invention to be accorded the full scope of the claims appended hereto.

What is claimed is:

1. An insect trap comprising in combination, a first container having therein a lure for poisoning insects, a second container containing water disposed adjacent to said first container, means providing for a relatively slow transfer of water from said second container to said first container for moistening said lure, said first container having a position relative to said second container allowing access of insects to the lure in said first container, means including at least one additional container positioned adjacent to said first container containing soil providing a planter disposed beneath said second container whereby growing plants may be provided for adjacent to the first container, and means providing for transfer of water at a relatively slow rate from said second container to said planter, said water transfer means comprising pieces of balsa wood disposed in the bottom of said second container, said pieces of balsa wood and the bottom of the second container having openings therein providing for transfer of water at a relatively slow rate to the said planter.

2. An insect trap comprising in combination a first container having therein a lure for poisoning insects, a second container containing water disposed adjacent to said first container, and means providing for a relatively slow transfer of water from said second container to said first container for moistening said lure, said first container having a position relative to said second container allowing access of insects to the lure in said first container, and means including at least one additional container positioned adjacent to said first container, and containing soil and providing a planter disposed at a lower level than said second container whereby growing plants may be provided for adjacent to the first container, and means providing for transfer of water at a relatively slow rate from said second container to said planter, said insect trap comprising a knock down construction, said planter comprising a pair of containers positioned back-to-back, the said pair of containers having upwardly extending back walls spaced from each other, said first and second containers being positioned between said back walls and supported thereby.

3. An insect trap comprising in combination, a first container having a lure for poisoning insects, a second container means for water disposed adjacent to said first container, means providing for a relatively slow capillary transfer of water from said second container means to said first container for moistening said lure, said first container having a position relative to said second container means allowing access of insects directly to the lure in said first container, means including a pair of additional containers containing soil positioned back-to-back below and adjacent to the first container and second container means, and extending outwardly therefrom, said additional containers providing planters whereby growing plants may be provided for adjacent to the first container and means providing for transfer of water at a relatively slow rate from said second container means to said additional containers, said first container and said second container means being positioned substantially at the same level, said pair of containers having inner wall members extending above the level of said second container, said inner wall members having openings therein, the said second container means having side parts thereof extending through said openings to provide support for the second container means with portions of the said second container means overhanging the said additional containers.

4. An insect trap as in claim 3 wherein said first container includes a container disposed at the end of said second container means between said upstanding inner wall means.

References Cited by the Examiner

UNITED STATES PATENTS

| | | | |
|---|---|---|---|
| 1,056,535 | 3/1913 | Grimes et al. | 43—131 |
| 1,187,426 | 6/1916 | Grigo | 43—131 |
| 2,781,607 | 2/1957 | Smiley | 43—131 |
| 2,799,121 | 7/1957 | Modeweg | 47—38 |

SAMUEL KOREN, *Primary Examiner.*

ABRAHAM G. STONE, *Examiner.*